Aug. 26, 1924.
G. W. COWGILL
1,506,411
TIRE CORE
Filed Feb. 29, 1924
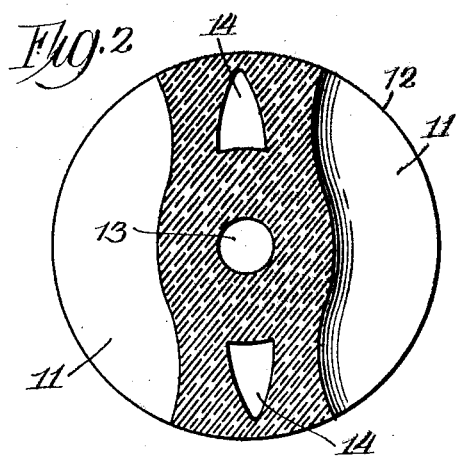
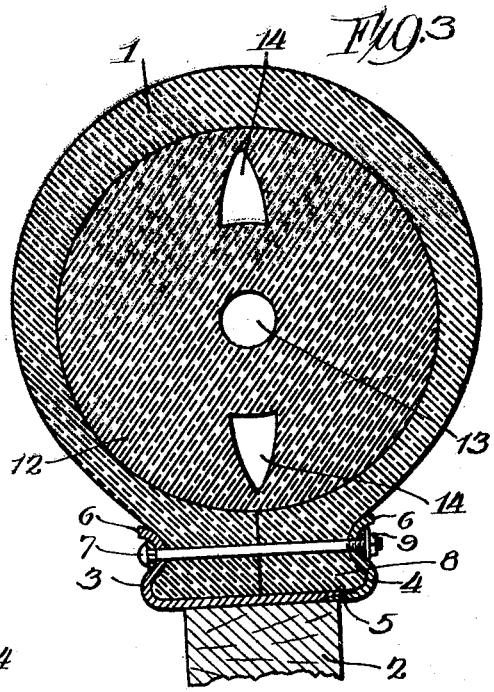
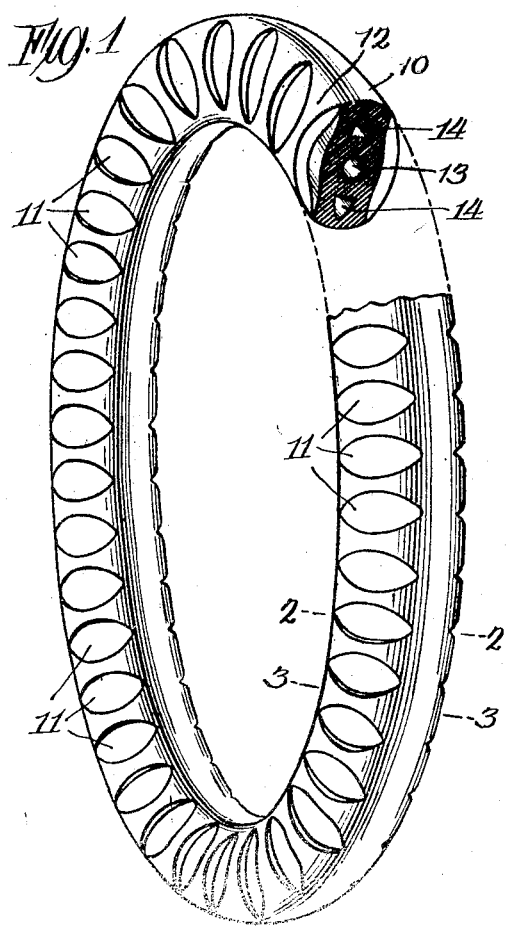
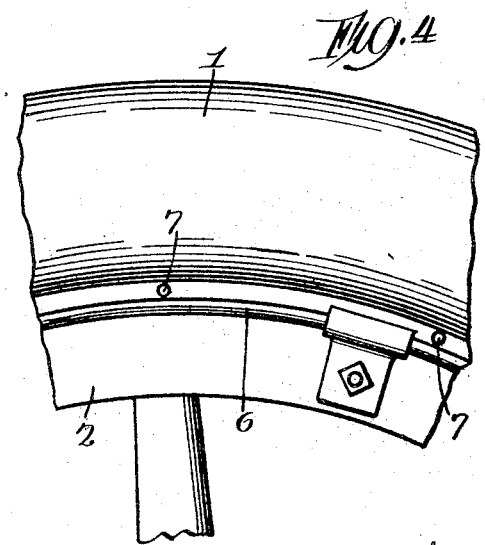
Inventor:
George W. Cowgill Patented Aug. 26, 1924.

1,506,411

UNITED STATES PATENT OFFICE.

GEORGE W. COWGILL, OF CHICAGO, ILLINOIS.

TIRE CORE.

Application filed February 29, 1924. Serial No. 695,978.

*To all whom it may concern:*

Be it known that I, GEORGE W. COWGILL, a citizen of the United States, residing at Chicago, in the county of Cook and State of Illinois, have invented new and useful Improvements in Tire Cores, of which the following is a specification.

This invention relates to new and useful improvements for cushion tires for vehicles, and the main object of my invention is the provision of a vehicle tire including a central core particularly constructed whereby the material of which the core is formed is so distributed throughout its construction as to provide the proper amount of material at the different points throughout the core so as to take care of the various resistances in accordance with the weight and strain applied to the tire and at the same time retain the proper amount of resiliency throughout the entire tire.

Another object of my invention is the provision of a vehicle tire which not only includes the particular type of inner core but provides novel means for mounting the core within the casing and attaching the casing to the felly of the wheel.

Another object of my invention is to provide an inner core that will take the place of the pneumatic tire and thus do away with the ever present fear of a blowout. We know that simplicity is the key to efficiency and it is my aim to make a tire so simple in construction that the unskilled can operate it as easily as those who are more skilled in the art.

A further object of my invention is to construct a tire that can be used on any size or kind of vehicle and take the place of the solid tire to lessen the wear and tear of the vehicle.

With the above and other objects in view the invention consists in the novel features of construction, the combination and arrangement of parts hereinafter more fully set forth, pointed out in the claims and shown in the accompanying drawings in which:—

Fig. 1 is a perspective view of a core constructed in accordance with my invention.

Fig. 2 is a transverse section view taken on the line 2—2 of Fig. 1.

Fig. 3 is a transverse sectional view taken on the line 3—3 of Fig. 1 with the casing applied to the inner core.

Fig. 4 is a side elevation of a portion of a tire constructed in accordance with my invention illustrating the application of the same to the felly of a wheel.

We know that when we have any resilient material smaller at one point than at the other the small portion will give first when subjected to pressure and by having the small portion in the center in the shape of the opposite sides of an hourglass we have a double resiliency, and by making additional openings, above and below the central opening, oval shaped toward the outer walls as shown in Fig. 2, we form an hourglass bracing bridgework which is the best support possible and when made of rubber or any similar substance forms the best resiliency possible..

It will be seen that the material of which the core is made is so distributed that the greatest amount of material is placed in the center where the greatest weight is and that on the sides where the least strain is there is very little material and what little there is acts as a brace for the material in the center, making the core as light as possible at the same time giving it great strength and resiliency.

Referring now more particularly to the drawings in which numerals are used to designate the various parts throughout the numeral 1 indicates the outer casing of my improved tire which is detachably connected with the felly 2 of the wheel by means of improved fastening means which include the opposite plate members 3 and 4 fitted together in overlapping relation as shown at 5. The plates 3 and 4 are provided with outstanding spaced flanges 6 the outer edges of which are curved to conform to the outer contour of the casing 1 so as to be correctly positioned with respect to the abutting edges of the casing. In order to retain the edges of the casing in their correct position with respect to the rim of the wheel a securing bolt 7 is extended through the flanges 6 and through the beadings 8 on the edges of the casing and retained in position by means of a removable nut 9 threaded onto one end of the bolt 7.

The improved core which is arranged within the casing 1 includes a circular body portion 10 having partitions 12 at diametrically opposed points upon each side of the core forming recesses 11 being preferably of oval shape as shown in Fig. 1. It will be noted that these oval shaped recesses have concave faces upon each side of the partitions 12 so as to distribute the material evenly between each of the recesses as shown in Fig. 1. The partitions are provided with a central opening 13 and opposed openings 14, said openings 14 being preferably tapered toward their outer sides as shown in Fig. 2 whereby to provide a greater resistance at the outer sides of the openings than at the inner sides in other words there will be more material remaining adjacent the outer sides of the openings to oppose the weight applied to the tire at this point while the material adjacent the inner ends of the openings will provide for the proper resiliency to absorb the shock and jar caused through the application of weight to the tire at this point.

As noted from Fig. 2 the central opening 13 extends circumferentially of the core 10 and the openings 14 also extend circumferentially of the core for taking care of the resistance throughout the entire circumference of the tire. Attention is directed to the fact that by forming the recesses 11 oval shaped the material remaining between said recesses is of substantially hour glass formation with the greater amount of material arranged adjacent each end of the recesses 11 and the smaller amount of material which forms the partitions 12 arranged at the central portions of the recesses so as to evenly distribute the resiliency of the core.

It will be apparent from the foregoing that I have provided an improved cushion tire which will quickly and readily absorb all shocks or jars caused by the tire coming in contact with various types of objects and provide the proper amounts of material at the various points required to provide for the proper resistance of the tire and to thoroughly distribute this resistance throughout the circumference of the tire.

While I have shown and described the preferred form of my invention I wish it to be understood that various changes and alterations may be carried out during the manufacture of the same without departing from the spirit of the invention or the scope of the appended claims.

Having thus described my invention what I claim is:—

1. A vehicle tire including a core, constructed of resilient material, with a circular opening in the center and additional openings, above and below the central opening, which are oval shaped toward the outer walls forming bracing arch like partition walls, said openings being evenly distributed at regular intervals and extending circumferentially of the core.

2. A vehicle tire including a core with a circular opening in the center and additional openings, above and below the central opening, which are oval shaped toward the outer walls forming bracing arch like partition walls, all three openings extending circumferentially of the core, said core having transverse partitions, on opposite sides of the central opening, of substantially the shape of the opposite sides of an hourglass, which are perpendicular at the apex of the core, forming oval recesses in the sides thereof, said openings, partitions and recesses being evenly distributed at regular intervals throughout the core.

In testimony whereof I affix my signature.

GEORGE W. COWGILL.